Aug. 28, 1956   J. A. COFFMAN   2,760,368
APPARATUS FOR MEASURING THE CONTENT OF WATER
AND SIMILAR COMPOUNDS IN INSULATING LIQUIDS
Filed Oct. 21, 1952
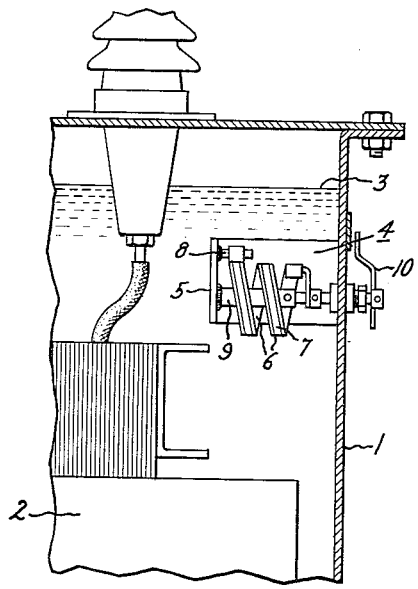
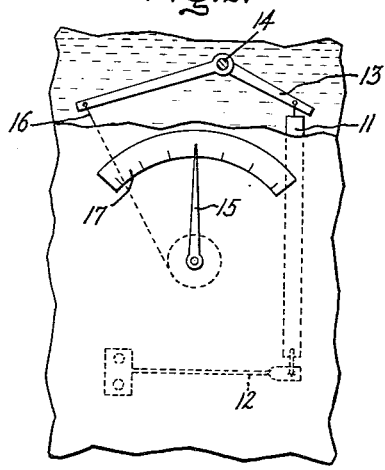
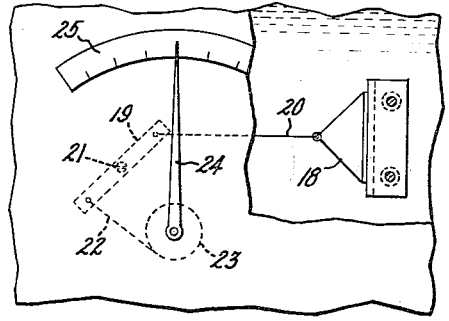
Inventor:
John A. Coffman,
by *Abraham Cohen*
His Attorney.

2,760,368

APPARATUS FOR MEASURING THE CONTENT OF WATER AND SIMILAR COMPOUNDS IN INSULATING LIQUIDS

John A. Coffman, North East, Pa., assignor to General Electric Company, a corporation of New York Application October 21, 1952, Serial No. 315,937

2 Claims. (Cl. 73—53)

This invention relates to apparatus for measuring the content of water and other impurities in insulating liquids. It is more particularly concerned with measuring the content of water, alcoholic and acidic impurities in insulating liquids used in connection with electrical apparatus.

One of the most troublesome problems in the electrical industry is that created by the deterioration of the insulating properties of liquid insulations due to increase in water content of such insulating liquids or to the presence therein of acidic, decomposition products. A reliable means for measuring the impurity (water or acid) content of such insulating liquids would be of considerable value to the electrical industry since the successful operation of many types of apparatus, such as transformers, oil-filled bushings, etc., is dependent upon maintaining the liquid dielectric in a dry and impurity-free state. Examples of such insulating liquids are mineral oil and the chlorinated aromatic compounds known as askarels.

While a number of methods of evaluating dissolved water in insulating liquids such as liquid hydrocarbon insulating fluids exist, they do not lend themselves to quick, accurate, and simple determinations. In one method, a hot metal piece is plunged into the hydrocarbon oil, the presence or absence of water in the oil being indicated by the nature of the crackling sounds produced. The inadequacy and inconvenience of such a test is obvious.

In another method, the dielectric strength of the oil is used as a measure of the dissolved water content. However, the dielectric strength of an oil is the net result of many factors, such as the presence of gas bubbles, gas in solution, the presence of fibers such as those of cellulose, and suspended dirt and other materials as well as the presence of moisture. Furthermore, the presence of fibers or other suspended materials has a greater effect on the dielectric strength than water alone. While dielectric strength gives a practical over-all indication of the usability of a liquid for electrical purposes, it cannot be used as a precise and continuous analytical tool for the measurement of dissolved water content.

Other methods of determining dissolved water content of mineral oils include measurement of the gas evolved when a reagent, such as sodium or certain metal hydrides, such as lithium hydride, are reacted with the contained water. Such procedure is at best for laboratory use and is inadequate for general use. The so-called "Karl Fischer method" is another test for laboratory use in which light colored liquids are dissolved in benzene and methanol and titrated to a color change and point with iodine which is dissolved in methanol and reacted with pyridine and sulfur dioxide.

Still other methods which have been proposed for the determination of dissolved water include removal of the water with a dry gas, removal by refrigerating, by condensing means, or by absorption in such media as phosphorus pentoxide and the like.

The tests mentioned above are all characterized by practical disadvantages which detract from their accuracy or ready use in the field or at the site of operations.

It is an object of this invention to provide a new and improved type of detecting device for use in measuring the content of water and other impurities dissolved in such liquids.

It is a specific object of this invention to provide electrical apparatus incorporating a new and improved device for detecting the presence of water, alcohols, acids and the like in insulating liquids and for indicating the relative proportions of such impurities.

The present invention is based in general on the discovery that the water, alcohol and acid content of an insulating liquid can be measured by means of any relative humidity gauge or indicator other than the wet and dry bulb thermometer type. While gauges of many known types can be employed, the invention will be particularly described with reference to specific embodiment thereof involving the use of a relative humidity gauge of cellulosic material to measure the water or acid content, or both, of mineral oil. The operation of such gauges for determining the relative humidity of air or other gaseous medium is based on the dimensional changes of the cellulosic element with changes in the moisture content of the gas. Other suitable gauges include those which measure relative humidity by changes in the electrical conductivity of any element.

The features of my invention which I believe to be novel and patentable are set forth with particularity in the appended claims. The invention itself, however, both as to its organization and use, together with further objects and advantages thereof, may best be understood by reference to the following description taken in connection with the accompanying drawing in which Fig. 1 represents a spiral type relative humidity gauge immersed in an insulating liquid inside of a containing tank for electrical apparatus; Fig. 2 represents a modified type of relative humidity gauge which may be used in accordance with my invention in which the humidity responsive element is a flat strip of cellulosic material; and Fig. 3 represents a modified type of humidity responsive device in which the humidity responsive member is a cone-shaped cellulosic element.

My invention is predicated upon the concept that the moisture or acid content of a hydrocarbon oil or other insulating liquid, can be expressed as a relative humidity, or in the broader sense "relative impurity." By determining the gauge readings for the pure insulating liquid and for the liquid saturated with the water or similar impurity at a given temperature the actual water or other impurity content of a sample of the liquid can be calculated from the relative humidity values indicated by the gauge by the same procedures employed in determining the relative humidity of air or other gas.

In accordance with one form of my invention, I immerse a cellulosic material in an insulating liquid such as mineral oil and and then measure the degree of deformation or dimensional change of the cellulosic material. I have determined experimentally, for example, that the water content of a cellulosic material immersed in oil is dependent upon the degree of saturation, or relative humidity, of the oil in exactly the same way that it is dependent upon the relative humidity of air. The cellulosic material which is immersed in the mineral oil is swelled by contact with the water or water vapor held in solution by the oil but is not dimensionally changed by contact with or immersion in the oil itself. Similar dimensional changes are obtained when the impurity in the oil is a hydroxyl-containing impurity other than water, such as an acid or an alcohol, to give what may be termed an "apparent relative humidity value."

A specific embodiment of a type of gauge embodying a cellulosic material for measurement of the degree of saturation of a hydrocarbon or chlorohydrocarbon insulating liquid with a hydroxyl-containing impurity is shown in Fig. 1 which illustrates a containing tank 1 for an electrical apparatus, such as an electrical transformer 2. While I have illustrated my invention contained within a casing for an electrical transformer, it will be understood that this is merely by way of illustration and that my invention may equally well be used with other types of electrical apparatus containing or immersed in insulating liquid, and also in other applications disassociated from any electrical apparatus. The tank 1 is normally filled nearly to its top or to its cover with an insulating liquid 3, such as oil. A cellulosic gauge 4 may be mounted at any convenient point within the casing 1 where it will be immersed in the liquid whose moisture content for example is to be determined. A bracket member 5 may be used to support the gauge 4 with respect to the tank 1. In the embodiment shown in Fig. 1, the gauge 4 comprises a metal spiral 6 having positioned continuously thereon a cellulosic absorbent material 7. The metal spiral 6 serves as a support member for the cellulosic material 7. One end of the metal spiral 6 is rigidly connected to a post 8 which is itself rigidly attached to the bracket member 5. The opposite end of the spiral is rigidly attached to a shaft 9 which is free to rotate. One end of the shaft 9 is supported by the bracket member 5 which serves as a bearing for shaft 9. Pointer 10 is rigidly attached to the outer end of shaft 9 and rotates with shaft 9. A suitable scale may be placed adjacent pointer 10 to indicate the motion of pointer 10 due to rotation of shaft 9. It will be seen that absorption of moisture by the cellulosic material 7 will cause expansion of the spiral in such manner as to rotate the shaft 9 and pointer 10, thereby giving a reading of relative humidity on a suitably-calibrated indicating scale positioned adjacent pointer 10.

Knowing the relative humidity of the insulating liquid, as indicated by gauge 4, and the temperature at which the reading is taken, the actual water content of the insulating liquid can be calculated using tables which give the water content of the saturated liquid at the temperature at which the reading is taken.

For example, a relative humidity gauge of the type shown in Fig. 1 was mounted on an oil-filled large transformer bushing at room temperature with the spiral element immersed in the oil. The pointer reached a steady value of 40 on the indicating scale in a bushing oil containing 24 p. p. m. (parts per million) water. (On the gauge scale a value of 40 indicates a relatively humidity in air of about 30%.)

Damp paper was then submerged in the oil and as the oil became slowly wetter, the gauge readings also increased but not quite at the same rate. For example, after two days when the water content was 48 p. p. m. the gauge value was 44 and after 8 days when the water content was 78 p. p. m. the gauge was at 49. It continued to rise, however, in water saturated oil until after 14 more days the gauge reached a steady value of 82 on its scale.

On being removed, and transferred to a relatively dry oil containing about 20 p. p. m. of water the scale reading again reverted to 40 divisions. While the rate of response of the gauge in oil is slower than in air it is still fast enough to warn an operator of a serious moisture condition between inspection periods of 2-week intervals.

Figure 2 illustrates a different type of humidity-responsive device which may be used to measure the relative humidity or impurity content of an insulating liquid in accordance with my invention. The humidity-responsive device shown in Fig. 2 uses a flat cellulosic humidity-responsive element 11 instead of the spiral cellulosic material of the element used in the embodiment of Fig. 1. The humidity-responsive element 11 is immersed in the liquid whose humidity is being measured and is rigidly attached at one end to a stationary arm 12 and at its opposite end to a lever member 13 which is pivoted at point 14. A cord of chain member 16 is connected to an end of lever 13 opposite the end to which humidity-responsive element 11 is connected. The chain or cord 16 is connected to a hub attached to pointer 15. The hub is spring biased to wind up the cord. Change in dimension of humidity-responsive element 11 causes motion of lever 13 which is communicated to pointer 15 through chain or cord 16. Pointer 15 indicates the relative humidity on a suitably-calibrated scale 17.

There is shown in Fig. 3 still another type of humidity-responsive device including an element which changes dimensions with changes in humidity and which may be used in accordance with my invention. A cone-shaped humidity responsive element 18 normally immersed in the insulating liquid whose relative humidity is being measured is connected to one end of a lever 19 by means of an appropriate cord member 20. The lever 19 is pivoted at point 21, and a chain or cord member 22 is connected to the end of the lever 19 opposite to the end at which cord 20 is connected. The other end of chain or cord member 22 is connected to spring biased hub 23, to which is attached a pointer 24. A suitably-calibrated scale 25 is provided adjacent the pointer 24 for indicating the relative humidity.

While the invention has been described primarily with reference to the determination of the water or moisture content of an insulating mineral oil by means of gauges commonly employed for measuring the relative humidity of air, tests have conclusively shown that such gauges are also responsive to the presence of other impurities such as acids and alcohols, particularly the low molecular weight acids and alcohols in which the hydroxyl group is a significant portion of the molecule. Likewise they may be used for measuring the impurity content of other insulating fluids such as the askarels composed of chlorinated aromatic compounds such as chlorinated diphenyl or chlorinated benzene. While the "saturation" reading on any specific gauge for an impurity may not be the same numerical value as the "saturation" reading for a different impurity or a mixture of impurities, once the "impurity" free gauge reading for any particular oil or other insulating liquid has been determined, any increase in this reading will indicate the presence of such impurity with the degree of increase being proportional to the relative amount of impurity present up to the "saturation" point.

Although many of the known humidity gauges, when used for measuring the relative humidity or impurity content of insulating liquids, may have a somewhat slower period of response than when the same gauges are used for measuring the relative humidity of air, the slower response does not detract from the practical value of the invention as the responsive action of the gauges is still fast enough, for example, to warn an operator of any serious change in the moisture or acidic condition of an insulating liquid between inspection periods of two-week intervals.

While there have been shown and described particular embodiments of my invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. Electrical apparatus comprising, in combination, a casing; an electrical device positioned in said casing; insulating liquid contained in said casing and operatively associated with said electrical device; a cellulosic element immersed in said insulating liquid, said cellulosic element being dimensionally changed by changes in the relative moisture and other hydroxyl impurity content of said insulating liquid; indicating means arranged externally of said casing; and connecting means between said cellullosic element and said indicating means for driving said indicating means in response to dimensional changes of said cellulosic element.

2. A transformer comprising, in combination, a liquid-tight casing; insulating liquid in said casing; a magnetic core with windings mounted thereon positioned in said casing and operatively associated with said insulating liquid; a cellulosic element immersed in said insulating liquid, said cellulosic element being dimensionally changed by changes in the relative moisture and other hydroxyl impurity content of said insulating liquid; indicating means arranged externally of said casing; and connecting means between said cellulosic element and said indicating means for driving said indicating means in response to dimensional changes of said cellulosic element.

References Cited in the file of this patent

UNITED STATES PATENTS

| | | |
|---|---|---|
| 1,293,527 | Ovington | Feb. 4, 1919 |
| 1,601,383 | Todd | Sept. 28, 1926 |
| 2,279,230 | Frost | Apr. 7, 1942 |
| 2,466,658 | Hiltz | Apr. 5, 1949 |
| 2,552,088 | Davis | May 8, 1951 |
| 2,573,685 | Blinn et al. | Nov. 6, 1951 |

FOREIGN PATENTS

| | | |
|---|---|---|
| 125,816 | Switzerland | May 16, 1928 |

OTHER REFERENCES

Chemistry and Industry, page 990, Dec. 8, 1933.